United States Patent [19]
Hesterman

[11] Patent Number: 5,568,041
[45] Date of Patent: Oct. 22, 1996

[54] LOW-COST POWER FACTOR CORRECTION CIRCUIT AND METHOD FOR ELECTRONIC BALLASTS

[75] Inventor: Bryce L. Hesterman, Fort Wayne, Ind.

[73] Assignee: MagneTek, Inc., Nashville, Tenn.

[21] Appl. No.: 385,906

[22] Filed: Feb. 9, 1995

[51] Int. Cl.⁶ .................................................. G05F 1/70
[52] U.S. Cl. ............................ 323/207; 323/222; 363/37; 363/89
[58] Field of Search .................................. 323/205, 207, 323/222; 363/34, 37, 84, 89

[56] References Cited

U.S. PATENT DOCUMENTS

| | | | |
|---|---|---|---|
| 4,370,600 | 1/1983 | Zansky | 315/244 |
| 4,392,087 | 7/1983 | Zansky | 315/219 |
| 4,788,485 | 11/1988 | Kawagishi et al. | 363/37 |
| 4,827,151 | 5/1989 | Okado | 323/222 |
| 4,855,652 | 8/1989 | Yamashita et al. | 363/37 |
| 4,933,605 | 6/1990 | Quazi et al. | 315/224 |
| 4,934,822 | 6/1990 | Higaki | 363/37 |
| 5,084,653 | 1/1992 | Nilssen | 315/219 |
| 5,119,283 | 6/1992 | Steigerwald et al. | 323/207 |
| 5,138,234 | 8/1992 | Moisin | 315/209 R |
| 5,148,087 | 9/1992 | Moisin | 315/291 |
| 5,245,522 | 9/1993 | Kawagishi et al. | 323/207 |
| 5,359,274 | 10/1994 | Bandel | 323/207 |
| 5,461,301 | 10/1995 | Truong | 323/207 |
| 5,465,011 | 11/1995 | Miller et al. | 363/34 |
| 5,489,837 | 2/1996 | Arakawa | 363/89 |
| 5,502,628 | 3/1996 | Arakawa | 323/207 |

OTHER PUBLICATIONS

Unitrode Linear Integrated Circuit Data and Applications Handbook, pp. 4–152 to 4–159, Apr. 1990.
Power Integrations, Inc., PWR–TOP 100–4, TOPSwitch Family, 3 Terminal Off–Line PWM Switch, 100–120 VAC Input, Regulated DC Output, Apr. 1994.
Redl, Richard, "Power–Factor Correction in Single–Phase Switching–Mode Power Supplies—an Overview," Invited Paper, Int. J. Electronics, vol. 77, No. 5, pp. 555–582, Jul. 1994.

*Primary Examiner*—Jeffrey L. Sterrett
*Attorney, Agent, or Firm*—Seldon & Scillieri

[57] ABSTRACT

The present invention provides a low-cost power factor corrected electronic ballast circuit. A preferred embodiment includes a discontinuous conduction mode boost power factor correction circuit that is controlled with a simple pulse-width modulator (PWM) circuit comprising a few discrete components instead of an integrated circuit. The PWM circuit utilizes a reference waveform signal derived from the ballast inverter. The reference waveform is combined with a feedback signal to create a composite signal that is compared with a reference voltage to create a pulse-width-modulated signal. The feedback signal is used to regulate the bulk DC voltage. In an alternative embodiment, a feedforward signal that is proportional to the time-varying level of the rectified line voltage is added to the reference waveform and the feedback signal, and serves to modulate the pulse width of the boost circuit in a manner that reduces the harmonic distortion of the input current. In addition to the boost circuit, the power factor correction circuit can be realized with flyback and buck-boost topologies. The invention can also utilize several different types of inverter circuits.

9 Claims, 8 Drawing Sheets

LOW-COST POWER FACTOR CORRECTION CIRCUIT AND METHOD FOR ELECTRONIC BALLASTS

BACKGROUND OF THE INVENTION

1. Technical Field

The present invention relates generally to circuits for correcting the power factor of rectifier circuits, and in particular to those power factor correction circuits used in electronic ballasts.

2. Background Art

Typical prior art regulated power factor control schemes employ an integrated circuit, along with several external components, to control the duty cycle of a power switching transistor. The duty cycle of the power switch is used to control the input current waveform so that it approximates the shape of the input voltage waveform. The output of the power factor controller is stored in a bulk DC capacitor in order to provide a relatively constant DC power supply for the ballast. An example of this is taught in U.S. Pat. No. 5,177,408 to Marques. The integrated circuits used in prior-art power factor controllers generally include a pulse-width modulator (PWM) circuit, a high-gain error amplifier, and various other circuits. A prior art example of an integrated circuit PWM controller with a feedforward input is the Unitrode UC1841. In that circuit, feedforward is implemented by adjusting the amplitude of the internal ramp generator in response to the voltage at the Vin SENSE pin.

SUMMARY OF THE INVENTION

The present invention provides a low-cost power factor corrected electronic ballast circuit. A preferred embodiment includes a discontinuous conduction mode boost power factor correction circuit that is controlled with a simple PWM circuit comprising a few discrete components instead of an integrated circuit.

Typical prior-art PWM circuits compare the output of an error amplifier with a ramp waveform generated by an oscillator. In the present invention, the PWM circuit utilizes a reference waveform signal derived from the ballast inverter in place of a ramp waveform. The reference waveform signal is combined with a feedback signal to form a composite control signal that is compared with a reference voltage to create a pulse-width modulated signal. In an alternative preferred embodiment, a feedforward signal is combined with the reference waveform signal and the feedback signal. Because the reference waveform is derived from the inverter, its amplitude cannot be controlled by a feedforward signal as is commonly done in prior-art circuits. Instead, in the combined control signal, the reference waveform signal is shifted with respect to the reference voltage by the feedforward and feedback signals.

The feedback signal is used to regulate the bulk DC voltage. It is derived from the amplitude of the reference waveform, which is related to the level of the bulk DC voltage. The reference waveform is rectified and filtered to provide a DC voltage from which the feedback signal is derived. This DC voltage is also used as a power supply for the PWM circuit.

The feedforward signal is proportional to the time-varying level of the rectified line voltage, and it modulates the pulse-width of the boost circuit in a manner that reduces the harmonic distortion of the input current.

In addition to the boost circuit, the power factor corrected circuit can be realized with flyback and buck-boost topologies. The present invention can also utilize several different types of inverter circuits.

DESCRIPTION OF SPECIFIC EMBODIMENTS

In conventional PWM circuits, an error amplifier amplifies the difference between a feedback signal (possibly in combination with a feedforward signal) and a fixed reference voltage. A comparator provides a pulse-width-modulated signal at its output by comparing the output of the error amplifier with a periodic reference waveform that has a triangular or ramp shape. The pulse width of the signal at the comparator output varies in accordance with the instances at which the error amplifier output voltage intersects the periodic reference waveform.

A preferred embodiment of the present invention provides a power factor control circuit based on a PWM circuit that utilizes as its reference waveform a scaled version of an oscillator waveform already found in electronic ballast inverter circuits. Thus, a separate waveform oscillator, as found in prior art circuits, is not required. The reference waveform derived from the ballast inverter is applied to the base of a small-signal switching transistor. As the shape of the lower portion of the reference waveform is approximately triangular, the duty cycle of output of the PWM circuit can be shifted up and down by adding signals to the voltage present in the base of the small-signal transistor.

In a preferred embodiment of the present invention, the duty cycle of the PWM circuit is controlled by two inputs, a feedback input and a feedforward input. The feedback input provides negative feedback by decreasing the duty cycle of the power switching transistor when the bulk voltage increases. This is accomplished by adding a signal that is proportional to the bulk DC voltage to the small-signal transistor base drive voltage. The feedforward input is coupled to the rectified line voltage and provides a signal that reduces the on-time of the power transistor as the value of the rectified line voltage increases. Properly modulating the duty cycle of the power transistor in response to the time-varying value of the rectified line voltage decreases the harmonic distortion in the input current while at the same time allowing the feedback signal to regulate the bulk voltage.

Figure 1:
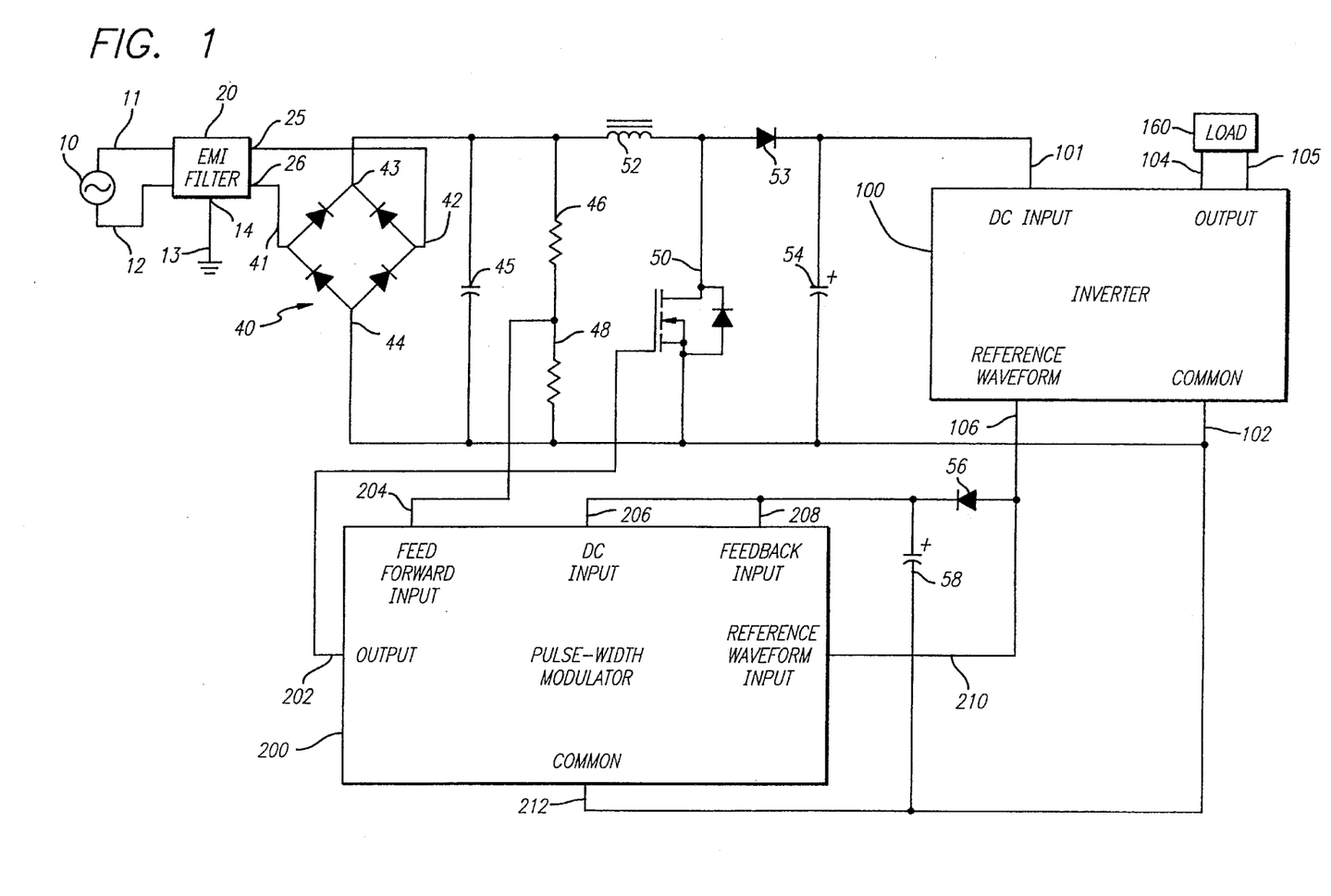
FIG. 1 shows a block diagram of a preferred embodiment of a power factor corrected electronic ballast circuit according to the present invention.

FIG. 1 shows a block diagram of a preferred embodiment of a power factor corrected electronic ballast according to the present invention. AC power source 10 supplies power to the ballast through input terminals 11 and 12 of an electromagnetic interference (EMI) filter 20. If desired, a metal-oxide varistor (MOV) could be placed across terminals 11 and 12 for protection against power line transients. Additionally, a fuse could also be inserted into the circuit, before or after the MOV. A safety ground 13 is connected to EMI filter 20 at a ground terminal 14.

Output terminals 25 and 26 of EMI filter 20 are connected, respectively, to input terminals 42 and 41 of a full-wave rectifier bridge assembly 40. When the ballast is operating, a full-wave rectified sine wave is present between positive and negative terminals 43 and 44 of bridge rectifier 40. When power is first applied, the rectified voltage will charge bulk storage capacitor 54 through a boost inductor 52 and diode 53 that are connected in series between terminal 43 of the bridge rectifier and the positive terminal of capacitor 54. The negative terminal of capacitor 54 is connected to terminal 44 of bridge rectifier 40, and forms a common return point for the ballast circuitry.

An inverter 100 has a DC input terminal 101 connected to the positive terminal of bulk storage capacitor 54, and a common terminal connected to the negative terminal of capacitor 54. A load 160, such as a gas discharge lamp, is connected between inverter output terminals 104 and 105.

In addition to powering the load 160, inverter 100 also produces a reference waveform at terminal 106, which in the present preferred embodiment performs three functions. First, terminal 106 is connected to reference waveform input 210 of PWM circuit 200, where it serves as a reference waveform for creating a pulse-width modulated signal at PWM output 202. Second, the signal at terminal 106 is rectified by diode 56 and filtered by capacitor 58 to provide a DC power supply at the PWM circuit DC input 206. The negative terminal of capacitor 58 is connected to the inverter's common terminal 102, and to the PWM circuit common terminal 212. The voltage across capacitor 58 can also be used to provide power to other circuits in the ballast. The amplitude of the reference waveform is proportional to the bulk voltage across bulk storage capacitor 54, so the voltage across capacitor 58 is also proportional to the bulk voltage. Thus, the third function of the reference signal is to provide feedback to regulate the voltage across bulk storage capacitor 54. This is accomplished by connecting feedback input 208 of the PWM circuit 200 to the positive terminal of capacitor 58.

Figure 2:
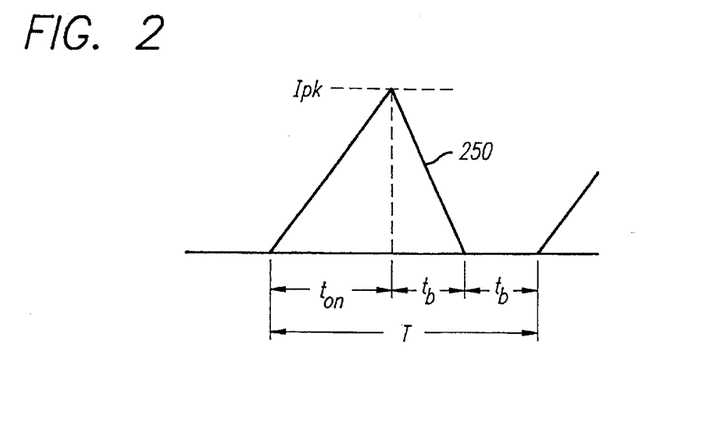
FIG. 2 shows an ideal waveform for the current flowing through the boost inductor in a preferred embodiment of a circuit according to the present invention.

PWM output 202 is connected to the gate of a MOSFET power switch 50 in order to produce a pulsating, discontinuous current in boost inductor 52. A bipolar transistor could be used in place of MOSFET 50. FIG. 2 shows an ideal waveform showing the relationship between the current flowing through boost inductor 52 and time. T is a single switching period, the length of which is determined by the operating frequency of inverter 100, and which is essentially constant for a given steady-state operating condition. Switching period T includes three intervals $t_{on}$, $t_b$, and $t_d$. During interval $t_{on}$, switch 50 is on, which allows current to begin to flow through boost inductor 52. At the end of that interval, switch 50 turns off, thereby causing diode 53 to begin to conduct. Boost inductor 52 discharges through diode 53, thereby charging bulk storage capacitor 54 during boost interval $t_b$. During "dead time" interval $t_d$, both transistor 50 and diode 53 are off.

Capacitor 45, in cooperation with EMI filter 20, smoothes the discontinuous inductor current so that the current flowing into the ballast is proportional to the cycle-by-cycle average of the current flowing in inductor 52. The AC input current to the ballast from AC source 10 should ideally have the same shape as the AC input voltage so that the ballast appears to be a resistive load.

Figure 3:
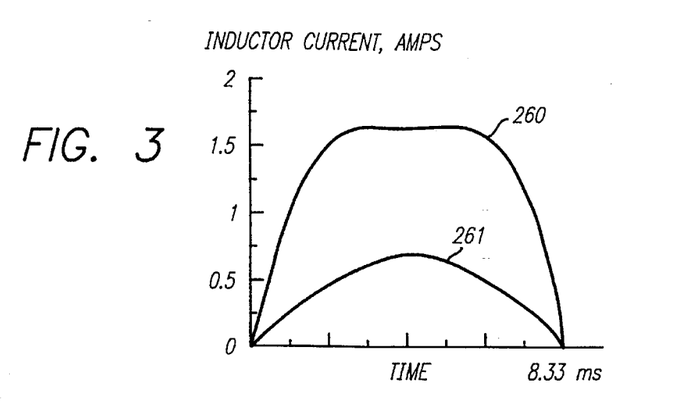
FIG. 3 shows a computer simulation of the envelope of the peak values of the current through the boost inductor and a computer simulation of the sinusoidal input current waveform in a preferred embodiment of a circuit according to the present invention.

FIG. 3 shows a sinusoidal input current waveform 261 calculated in a computer simulation of an implementation of a ballast according to the present invention that draws 58 W from a 120 V, 60 Hz power source. Plot 260 represents the calculated envelope of the peak values of the inductor current, denoted by $I_{pk}$ in FIG. 2.

The duty cycle d of transistor 50 is defined by the following formula:

$$d = \frac{t_{on}}{T}$$

The ideal duty cycle for a constant-frequency discontinuous-mode boost power factor correction circuit is given by:

$$d = \sqrt{\frac{2P_{in}}{V_{rms}^2} \frac{L}{T} \frac{V_o}{V_{in}}}$$

where:

$P_{in}$=input power to ballast $V_{rms}$=value of voltage of AC source 10

L=inductance of inductor L $V_o$=DC voltage across capacitor 54

$V_{in}$=instantaneous value of voltage across capacitor 45

Equation (2) is based on the assumptions that the variation of $V_{in}$ over one switching cycle is negligible, and that the ripple voltage across capacitor 54 is small.

Figure 4:
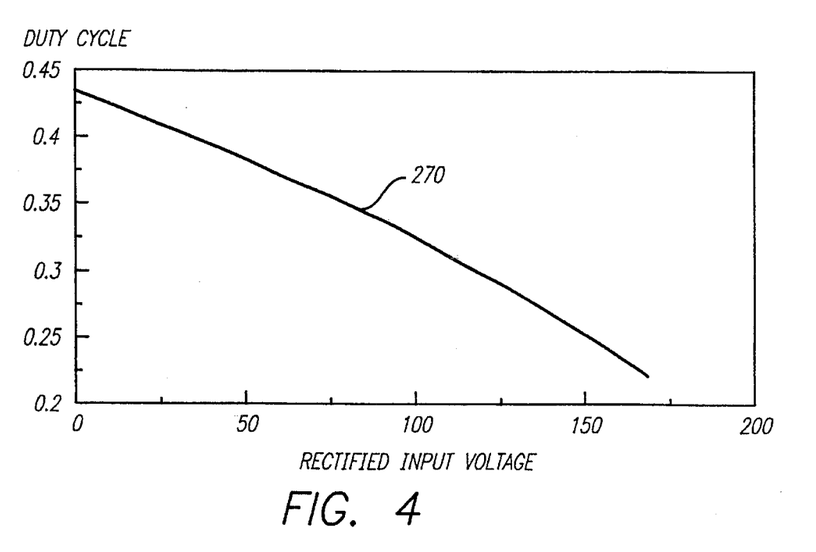
FIG. 4 shows a plot of an ideal relationship between the rectified input voltage and the duty cycle of the boost power switch in a preferred embodiment of a circuit according to the present invention.

FIG. 4 is a graph showing the relationship between the rectified input voltage $V_{in}$ and the duty cycle d according to equation (2) for the conditions specified above regarding FIG. 3 where $V_o$=230 V

L=470 μH

T=20 μs

As is apparent from FIG. 4, ideal duty cycle trajectory 270 is essentially linear over the range of $V_{in}$, so this ideal duty cycle relationship can be approximated by using a pulse-width modulator 200 that is essentially linear over most of the operating range of a feedforward input 204. Resistors 46 and 48 are connected as a voltage divider to scale $V_{in}$ to a level suitable for feedforward input 204.

Figure 5:
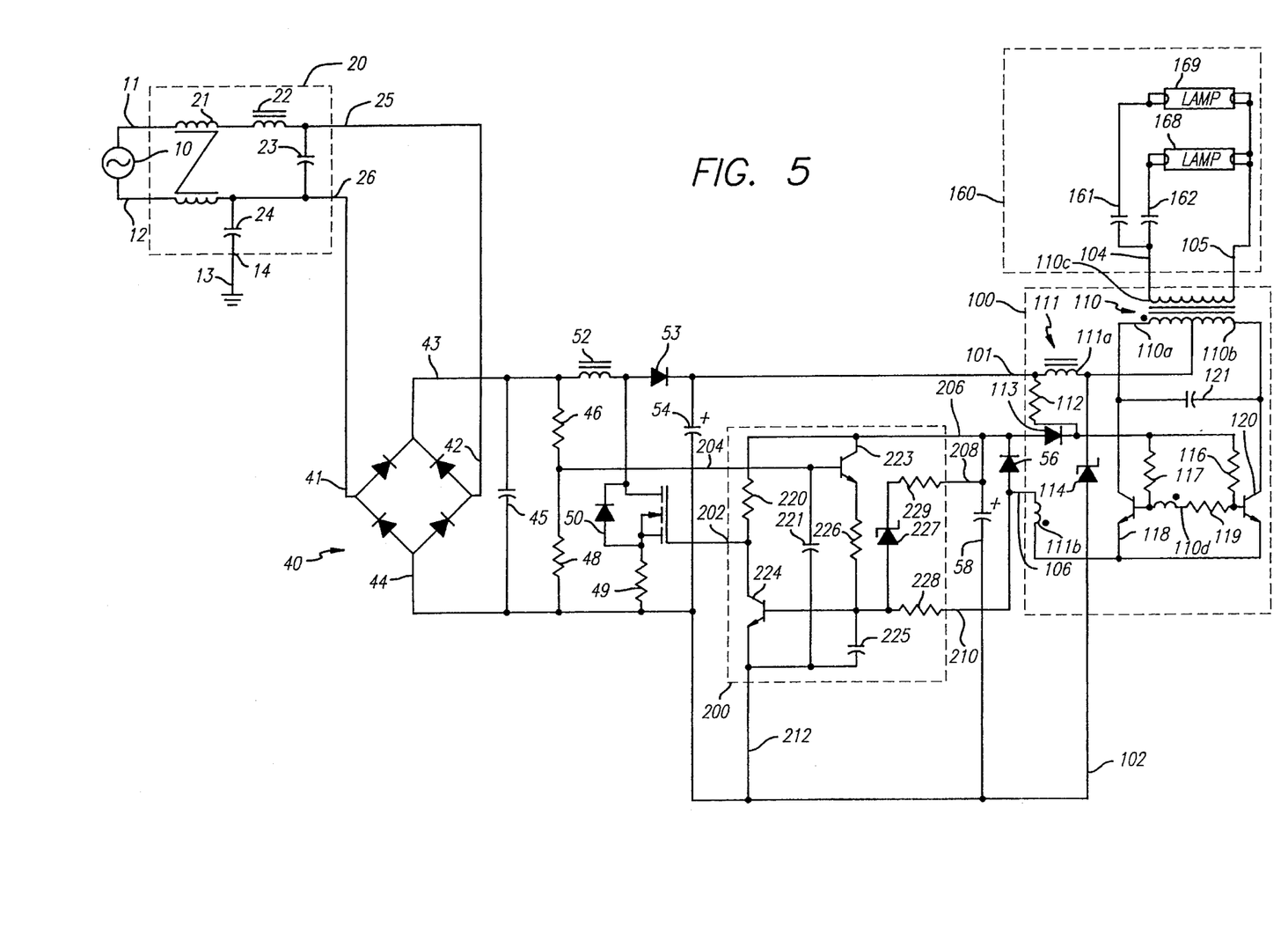
FIG. 5 shows a circuit diagram of a preferred embodiment of an electronic ballast according to the present invention that employs a push-pull, parallel-resonant inverter.

FIG. 5 shows a schematic diagram of a preferred embodiment of an electronic ballast according to the present invention suitable for operation from a 120 V AC source. EMI filter 20 comprises a common-mode choke 21, a differential-mode choke 22, an X capacitor 23, and a Y capacitor 24.

Components 40–58 of the FIG. 5 embodiment are substantially identical to their counterparts in FIG. 1. In the FIG. 5 embodiment, a resistor 49 is connected between the negative terminal of capacitor 54 and the source of MOSFET 50 to limit the drain current to a safe level during the startup interval when capacitor 54 is being charged.

The pulse-width modulator circuit of the FIG. 5 embodiment comprises components 220–229, encompassed by box 200. Resistor 220 is connected to the gate of MOSFET 50 and to the collector of transistor 224. Resistor 220 turns transistor 50 on whenever transistor 224 is off. Reference waveform input 210 is coupled to the base of transistor 224 by a resistor 228. Transistor 224 turns on whenever its base-to-emitter voltage is greater than about 0.75 V. A transistor 223 operates as a voltage follower to buffer the signal present at feedforward input 204. The base of transistor 223 is connected to feedforward input 204, and also to a capacitor 221 which shunts high-frequency noise to common terminal 212. The collector of transistor 223 is connected to DC input 206, which has a voltage of approximately 10 V with respect to common terminal 212. The emitter of transistor 223 is coupled to the base of transistor 224 through a resistor 226, which sets the amount of modulation in the duty cycle of transistors 224 and 50 in response to the signal present at feedforward input 204. A capacitor 225 is connected between the base and emitter of transistor 224. Capacitor 225 prevents spurious oscillations in transistor 224, and also makes the response of PWM circuit 200 more linear with respect to feedback input 208.

Feedback input 208 is coupled to the base of transistor 224 through a resistor 229 and a Zener diode 227 connected in series. The resistor-diode combination takes the place of an error amplifier and reference voltage in a conventional PWM circuit. Increasing the voltage at feedback input 208 beyond the point at which Zener diode 227 begins to conduct reduces the duty cycle of transistor 50, which reduces the bulk DC voltage. Resistor 229 sets the gain of the bulk voltage feedback loop. The loop gain varies inversely with the value of resistor 229. The overall loop gain should be approximately 1 to 2 near the peak of the AC line. Too much loop gain will cause excessive modulation of the AC input current because of 120 Hz ripple in the bulk voltage. This modulation increases the total harmonic distortion (THD) of the input current.

Figure 6:
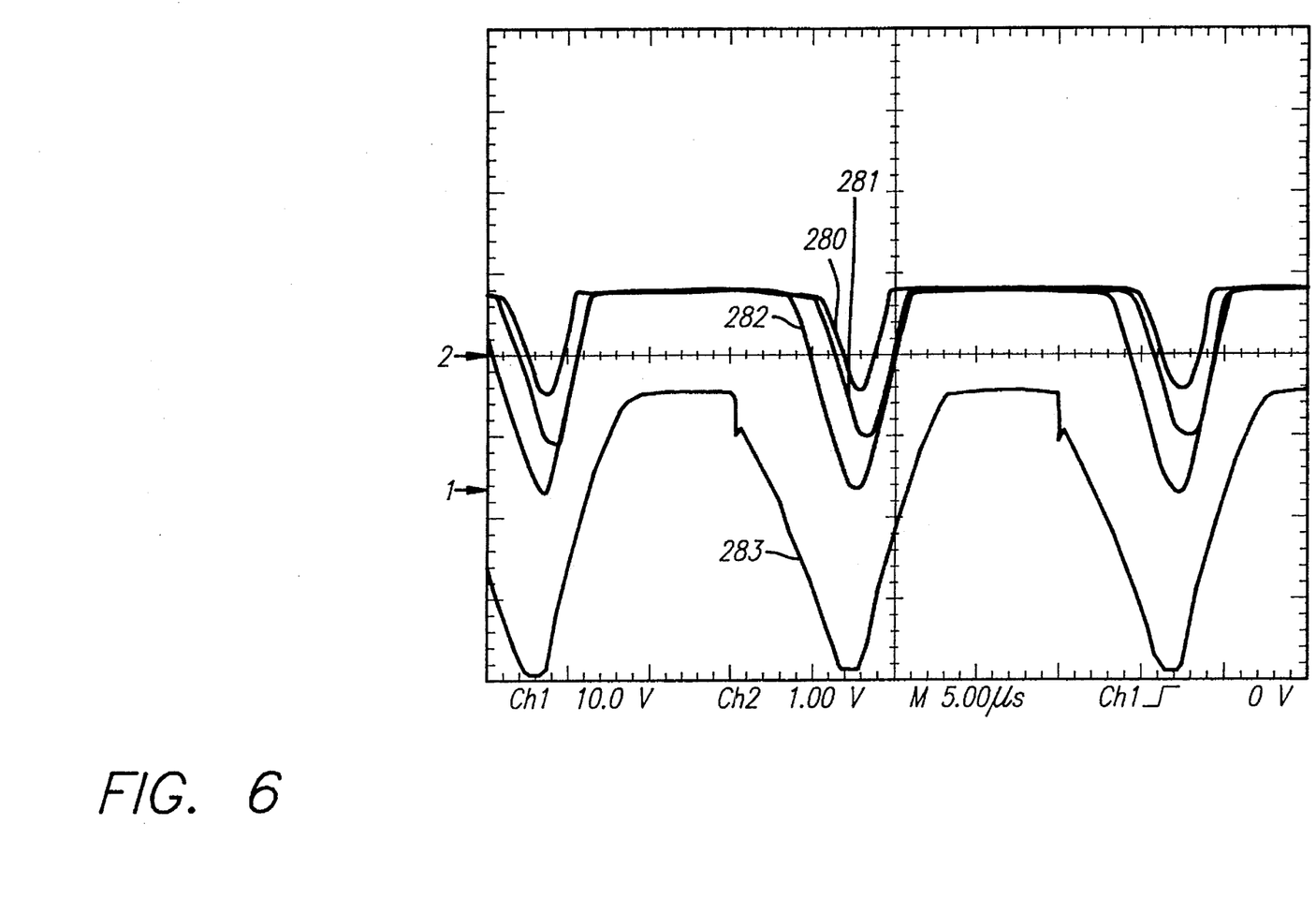
FIG. 6 shows a composite oscilloscope plot of waveforms occurring in the ballast circuit shown in FIG. 5.

FIG. 6 shows a composite oscilloscope plot of waveforms that occur in the electronic ballast circuit shown in FIG. 5. Waveform 283 is a plot of reference waveform 106. The ground reference level of waveform 283 is indicated by a number 1 at the lefthand side of the plot. The flat top of reference waveform 283 occurs when diode 56 turns on and charges capacitor 58.

It will be seen in FIG. 5 that, instead of comparing the output of an error amplifier with a reference waveform, the present ballast circuit adjusts the duty cycle of the pulse signal output of the PWM circuit by, in effect, sliding the reference waveform signal up and down with respect to the base-to-emitter turn-on voltage of transistor 224 in response to signals at the feedforward and feedback inputs.

In FIG. 6, waveforms 280, 281, and 282 are base-to-emitter voltage waveforms for transistor 224 that were taken at different times during the 60 Hz AC line voltage cycle and then superimposed to show the duty cycle modulation caused by feedforward input 204. Waveform 280, the top waveform shown, corresponds to the peak of the AC line voltage. Waveform 281, the middle waveform shown, corresponds to an intermediate condition. Waveform 282, the bottom of the three waveforms, occurs near the zero crossing of the AC input voltage. Thus it will be seen that, as the AC line voltage increases from its zero crossing to its peak, the on-time of transistor 224 also increases. This, in turn, reduces the on-time of power switching transistor 50.

The inverter in the FIG. 5 embodiment comprises components 101–121, encompassed by box 100. A resistor 112 is connected between DC input terminal 101 and the junction of resistors 116 and 117. Resistor 112 supplies a trickle current to start oscillations in inverter circuit 100. Once oscillations have begun, an AC voltage will appear across winding 111a of inductor 111. A scaled version of that voltage appears across winding 111b, which is connected between reference waveform terminal 106 and common terminal 102. The positive terminal of capacitor 58 is coupled through a diode 113 to the junction of resistor 116 and 117 in order to provide bias currents for switching transistors 118 and 119. Diode 113 prevents the trickle current through resistor 112 from flowing into PWM circuit 200, so that there is sufficient current to start oscillations in inverter 100.

When the circuit is operating, a sinusoidal voltage appears across the windings of inverter transformer 110. Primary windings 110a and 110b are connected between the collectors of transistors 118 and 119. One end of winding 111a is connected to DC input terminal 101. The other end of connected to the junction of windings 110a and 110b. The inductance of winding 111a forces the input current to inverter 100 to be relatively constant. A capacitor 121 is connected across the primary windings of transformer 110 to form a parallel-resonant tank circuit. A secondary winding 110c is connected between inverter output terminals 104 and 105.

The load 160 of the FIG. 5 embodiment comprises components 161, 162, 168, and 169, encompassed by box 160. A first ballast capacitor 161 and lamp 169 are connected in series between inverter output terminals 104 and 105. A second ballast capacitor 162 and lamp have a similar series connection. The current through the lamps 168, 169 is limited by the reactance of the ballast capacitors 161, 162.

Component values for a ballast intended to operate two 32 W T8 lamps are shown below:

| | |
|---|---|
| 10 | 120 V, 60 Hz |
| 21 | 5 mH |
| 22 | 600 μH |
| 23 | 470 nF |
| 24 | 3.3 nF |
| 40 | 1N4007 x4 |
| 45 | 470 nF |
| 46 | 220 kΩ |
| 48 | 7.5 kΩ |
| 49 | 0.47 kΩ |
| 50 | IRF730 |
| 52 | 450 μH |
| 53 | UF4007 |
| 54 | 47 μF |
| 56 | EGP10A |
| 58 | 47 μF |
| 110a | 1.46 mH |
| 110b | 1.46 mH |
| 110c | 5.84 mH |
| 110d | 374 nH |
| 111a | 18 mH |
| 111b | 160 μH |
| 112 | 330 kΩ |
| 113 | EGP10A |
| 114 | 440 V, 5 W |

-continued

| | |
|---|---|
| 116 | 1.5 kΩ |
| 117 | 1.5 kΩ |
| 118 | MJE18204 |
| 119 | 1.5 Ω |
| 120 | MJE18204 |
| 121 | 2.3 nF |
| 161 | 2.3 nF |
| 162 | 2.3 nF |
| 220 | 100 Ω |
| 221 | 4.7 nF |
| 223 | 2N4401 |
| 224 | 2N4401 |
| 225 | 4.7 nF |
| 226 | 300 Ω |
| 227 | 9.1 V, 0.5 W |
| 228 | 910 Ω |
| 229 | 220 Ω |

Figure 7:
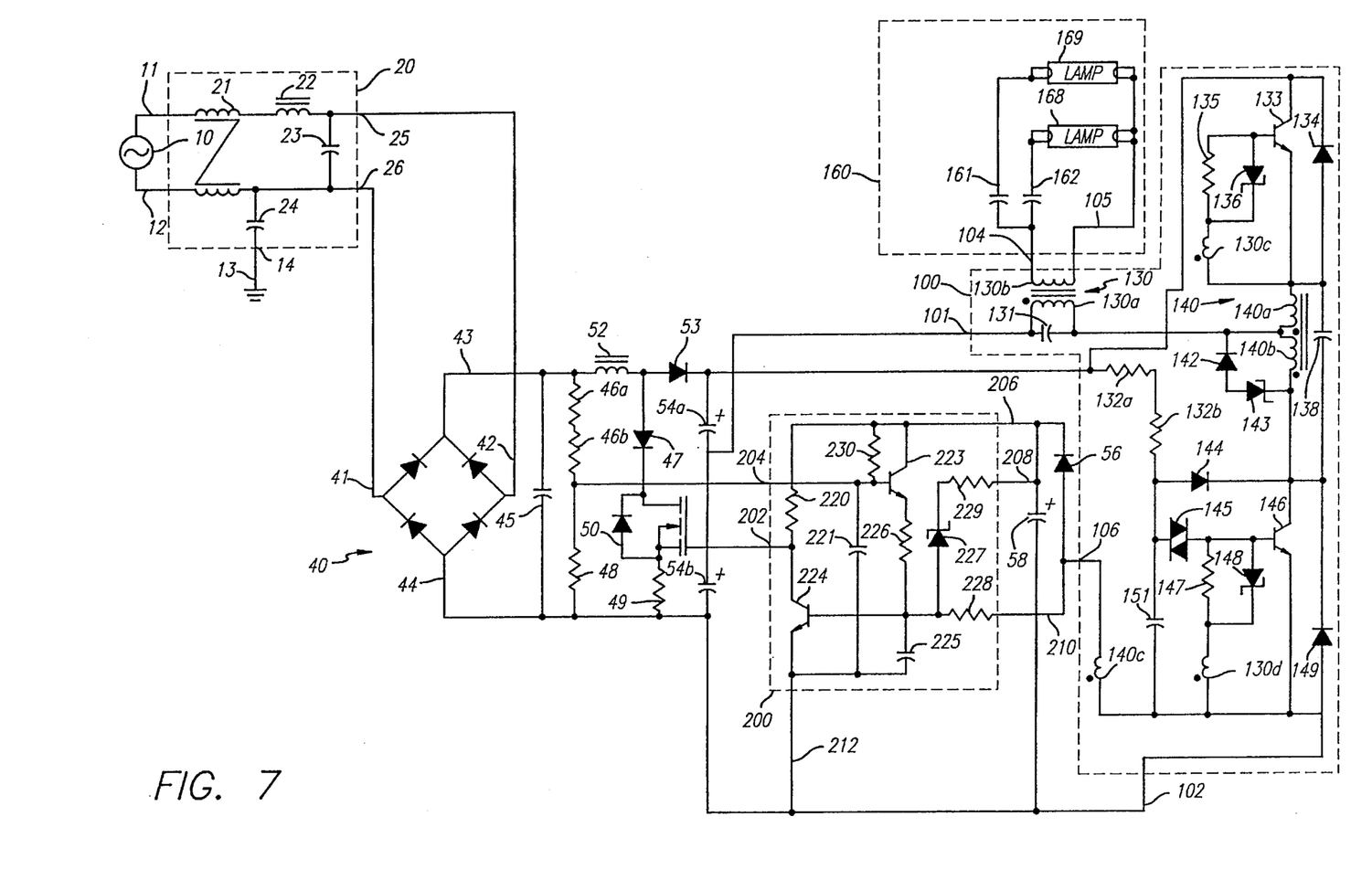
FIG. 7 shows a circuit diagram of a preferred embodiment of an electronic ballast according to the present invention that employs a half-bridge, parallel-resonant inverter.

FIG. 7 shows a schematic diagram of an alternative preferred embodiment of an electronic ballast according to the present invention suitable for operation from a 277 V AC source. In this embodiment, inverter 100 comprises a half-bridge, parallel resonant circuit instead of the push-pull, parallel resonant circuit shown in the FIG. 5 embodiment. One advantage of the half-bridge circuit is that, for the same input voltage, the collector-emitter voltage across each of the two switching transistors 133 and 146 is half the corresponding voltage across the two switching transistors 118 and 120 in the push-pull circuit shown in FIG. 5.

The structure and function of the EMI filter, rectifier and boost circuit in the FIG. 7 embodiment are the same as the corresponding components of the FIG. 5 embodiment, with a few minor changes. In order to withstand the higher voltage levels, the FIG. 7 embodiment substitutes series-connected resistors 46a and 46b for resistor 46 shown in FIG. 5. For the same reason, in FIG. 7 capacitors 54a and 54b are substituted for capacitor 54 in FIG. 5.

Further, in FIG. 7, a diode 47 is added in series with the drain of FET 50 in order to prevent the capacitance of the transistor from ringing with boost inductor 52 during interval $t_d$ shown in FIG. 2. This ringing is more of a problem at higher voltages and lower power levels. Thus, a diode corresponding to diode 47 in FIG. 7 could be added in series with the drain of FET 50 in FIG. 5 if the ringing were excessive in a circuit operating at a lower power level, such as a one-lamp ballast.

In addition, in FIG. 7, a resistor 230 is connected between the collector and base of transistor 223 to help PWM circuit 200 more closely approximate the ideal response described by equation (2). Connecting a corresponding resistor between the collector and base of transistor 223 in FIG. 5 may also be useful there in adjusting the PWM circuit.

When power is first applied to the FIG. 7 circuit, the series combination of bulk capacitors 54a and 54b is charged to the peak value of the AC line voltage. The positive terminal of capacitor 54a is connected to inverter DC input terminal 101, and the negative terminal of capacitor 54b is connected to inverter common terminal 102. Capacitor 151 is charged from terminal 101 through resistors 132a and 132b until the voltage across capacitor 151 is great enough to break over diac 145. When diac 145 fires, it delivers a pulse of current to the base of a power switching transistor 146, which initiates oscillations in inverter 100.

A diode 144 is connected between the junction of capacitor 151 and diac 145, and the collector of switching transistor 146. Once oscillations have begun, diode 144 prevents capacitor 133 from charging to a high enough voltage to fire diac 145. Switching transistors 146 and 133 are forced to conduct in alternating sequence due to the phasing of windings 130c and 130d of transformer 130. Winding 130c is coupled to the base of transistor 133 through the parallel combination of resistor 135 and Schottky diode 136. Similarly, winding 130d is coupled to the base of transistor 146 through the parallel combination of resistor 147 and Schottky diode 148. Resistors 135 and 147 limit the forward base currents in transistors 133 and 146, while diodes 136 and 148 allow the transistors to turn off quickly.

In FIG. 5, sinusoidal oscillations are created when the current through inductor winding 111a is alternately steered through windings 110a and 110b. In FIG. 7, transistor 133, windings 140a and 140b of inductor 140, and transistor 146 are connected in series with the bulk DC voltage across capacitors 54a and 54b. When transistors 133 and 146 alternately conduct, they force a square wave of current from the junction of windings 140a and 140b through a parallel-resonant tank comprising winding 130a of transformer 130 and capacitor 131. This develops a sinusoidal voltage across winding 130a. Thus, in both FIG. 5 and FIG. 7, a sinusoidal voltage is developed by steering an inductor current in alternating directions through a parallel-resonant tank circuit.

Capacitor 138 is connected in shunt across windings 140a and 140b to act as a snubber for the leakage inductance between windings 140a and 140b. A diode 134 is connected is connected in an anti-parallel manner across transistor 133, and diode 149 is connected in an anti-parallel manner across transistor 146. These diodes provide a path for reverse currents to flow around the transistors. Diode 142 and Zener diode 143 are connected in series across winding 140b to dissipate the energy stored in inductor 140 if a lamp is disconnected while inverter 100 is operating.

The voltage waveforms across the windings of inductor 140 have the same shape as the waveforms across the windings of inductor 111 in FIG. 5. Consequently, winding 140c in FIG. 7 performs the functions that were described above for winding 111b in FIG. 5, including the generation of a scaled version of the inverter output for use as a reference waveform by PWM circuit 200. Winding 140c should be placed in between windings 140a and 140b so that winding 140c will be equally coupled to the other two windings.

Winding 130b provides a sinusoidal voltage to inverter output terminals 104 and 105. Ballast capacitor 161 and lamp 169 are connected in series between inverter output terminals 104 and 105. Ballast capacitor 162 and lamp 168 have a similar series connection. The current through lamps 168 and 169 is limited by the reactance of the ballast capacitors.

Component values for a ballast intended to operate two 32 W T8 lamps are shown below:

| | |
|---|---|
| 10 | 277 V, 60 Hz |
| 21 | 10 mH |
| 22 | 5.3 mH |
| 23 | 100 nF |
| 24 | 1.5 nF |
| 40 | 1N4007 x4 |
| 45 | 100 nF |
| 46a | 180 kΩ |
| 46b | 180 kΩ |
| 47 | UF4007 |
| 48 | 5.1 kΩ |
| 49 | 1.5 Ω |
| 50 | IRFB20 |
| 52 | 2 mH |
| 53 | UF4007 |
| 54a | 33 μF |

-continued

| | |
|---|---|
| 54b | 33 µF |
| 56 | EGP10A |
| 58 | 47 µF |
| 130a | 1.4 mH |
| 130b | 7.75 mH |
| 130c | 416 nH |
| 130d | 416 nH |
| 132a | 470 kΩ |
| 132b | 470 kΩ |
| 133 | MJE18204 |
| 134 | UF4007 |
| 135 | 150 Ω |
| 136 | 1N5817 |
| 138 | 2.0 nF |
| 140a | 6.5 mH |
| 140b | 6.5 mH |
| 140c | 58 µH |
| 142 | 1N4007 |
| 143 | 200 V, 5 W |
| 144 | 1N4007 |
| 145 | HT-32 |
| 146 | MJE18204 |
| 147 | 150 Ω |
| 148 | 1N5817 |
| 149 | UF4007 |
| 151 | 100 nF |
| 161 | 2.3 nF |
| 162 | 2.3 nF |
| 220 | 100 Ω |
| 221 | 4.7 nF |
| 223 | 2N4401 |
| 224 | 2N4401 |
| 225 | 4.7 nF |
| 226 | 300 Ω |
| 227 | 9.1 V, 0.5 W |
| 228 | 1.02 kΩ |
| 229 | 100 Ω |
| 230 | 30 kΩ |

Figure 8:
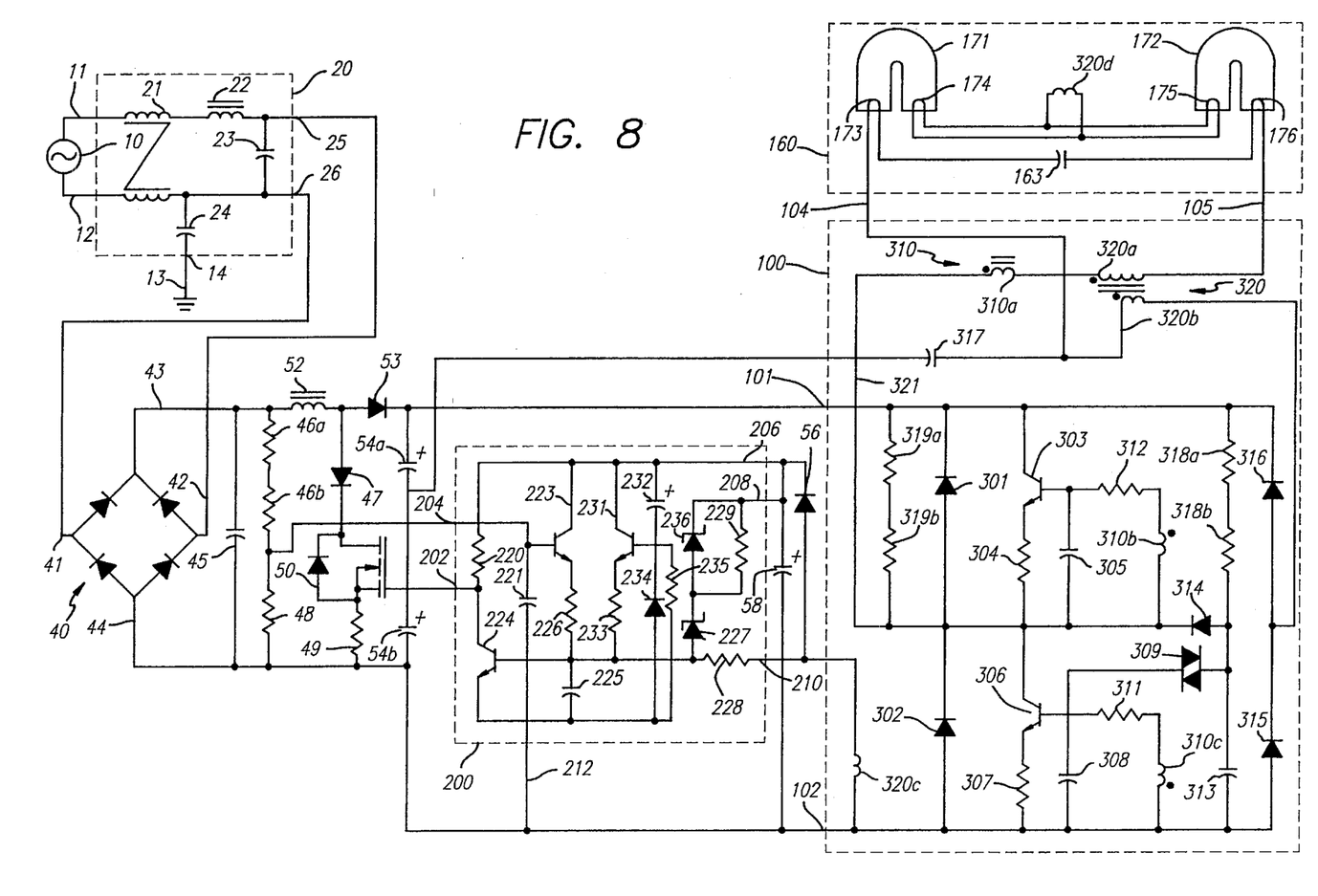
FIG. 8 shows a circuit diagram of a preferred embodiment of an electronic ballast according to the present invention that employs a half-bridge, series-resonant inverter.

FIG. 8 shows a schematic diagram of an alternative preferred embodiment of an electronic ballast circuit according to the present invention suitable for operation from a 277 V AC source. In FIG. 8, inverter 100 is realized with a half-bridge, series resonant circuit instead of the parallel resonant circuits shown in FIGS. 5 and 7. Series-resonant ballast inverters can be built with smaller, and thus less costly, magnetic components than those used to build parallel-resonant ballast circuits operating at the same power level. Additional savings are achieved in the circuit of FIG. 8 by eliminating the output transformer.

The structure and function of the EMI filter, rectifier and boost circuits in FIG. 8 are the same as those in FIG. 7, but PWM circuit 200 has two new features. The first new feature is the addition of Zener diode 236 in parallel with resistor 229. This change is required because, unlike the circuits of FIGS. 5 and 7, the amplitude of the reference waveform signal at terminal 106 is strongly affected by load 160.

In FIG. 8, the reference waveform output 106 of inverter 100 is derived from the resonant inductor in a series-resonant circuit instead of being derived from a current-smoothing inductor in a parallel-resonant circuit as shown in FIGS. 5 and 7. In FIG. 8, winding 320c on series-resonant inductor 320 has one end connected to reference waveform terminal 106, and the other end connected to common terminal 102. Unlike the inductor voltage in parallel-resonant circuits, the voltage waveform across winding 320c is symmetrical. Thus, the polarity is not significant, and no polarity dot is shown for winding 320c. The shape of the waveform across inductor 320 is approximately triangular near its peaks, so it is suitable for use as a PWM reference waveform.

As in the embodiments shown in FIGS. 5 and 7, the reference waveform is rectified by diode 56 and filtered by capacitor 58 and then provided as a feedback input to the PWM circuit at terminal 208. Under normal operating conditions, the voltage applied to feedback input 208 is indicative of the voltage at bulk storage capacitors 54a and 54b, and the PWM maintains the bulk voltage at the desired level by decreasing the duty cycle of the PWM pulse signal output when the bulk voltage exceeds a threshold defined by Zener diode 227.

However, if either of the lamps 171, 172 shown in FIG. 8 should become worn out or broken and fail to start while all of the lamp filaments are unbroken, then the amplitude of the series-resonant oscillations increases significantly, which increases the voltage at reference waveform output terminal 106. This increases the duty cycle of switch 50 beyond the level required to maintain the desired bulk voltage, even though the voltage at feedback input terminal 208 continues to be proportional to the amplitude of the reference voltage waveform signal.

The addition of Zener diode 236 in parallel with resistor 229 forces the duty cycle back to the small value that is required to keep the bulk voltage under control when the ballast is unloaded. The voltage rating specified in Table 3, below, for Zener diode 236 is such that the bulk voltage drops below its normal operating value during the deactivated lamp condition, thereby reducing the power dissipation in the inverter.

Figure 9:
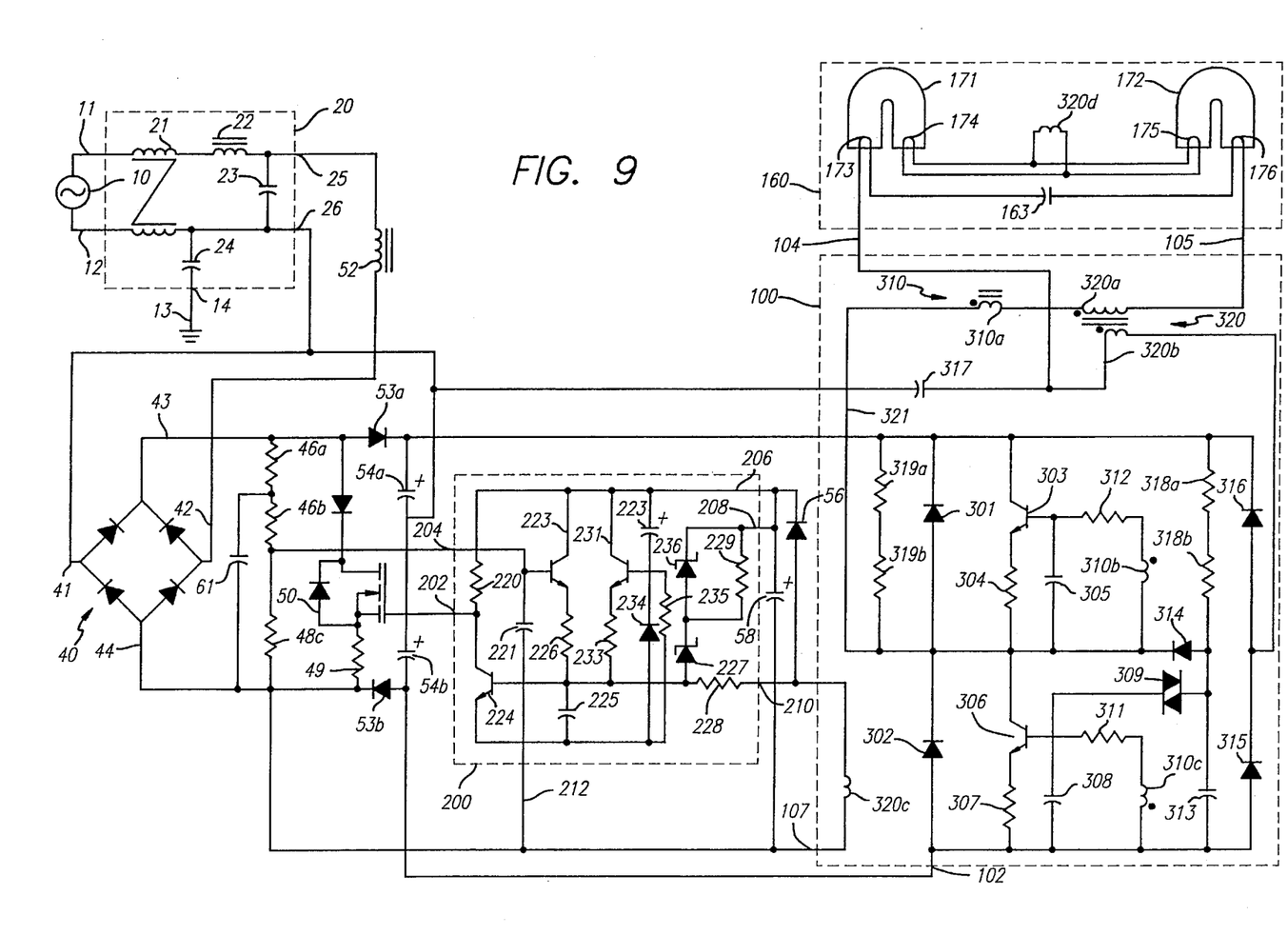
FIG. 9 shows a circuit diagram of a preferred embodiment of an electronic ballast according to the present invention that employs a half-bridge, series-resonant inverter and a voltage-doubler boost power factor correction circuit.

The second new feature added to the FIG. 9 embodiment of the PWM circuit is a hold-off circuit that delays that operation of the boost circuit for several tenths of a second after power is applied to the ballast. This feature is inherently found in power factor correction circuits that use integrated circuits, since it typically takes several tenths of a second for the integrated circuit to start operating. Holding off the boosting action allows the filaments to be heated while the bulk voltage, and consequently, the voltage across the lamps, is insufficient to strike the lamps. After the hold-off period, the boosting action begins, the bulk voltage rises to its regulated value, and the lamps strike.

The collector of a transistor 231 is connected to DC input terminal 206 of PWM circuit 200. A resistor 233 is connected between the emitter of transistor 231 and the base of transistor 224. A capacitor 232 is connected between DC input terminal 206 and the base of transistor 231. A resistor 235 is connected between the base of transistor 231 and common terminal 212. The cathode of a diode 234 is connected to the base of transistor 231 and the anode of diode 234 is connected to common terminal 212.

When power is first applied to the ballast, capacitor 232 will be discharged. After inverter 100 begins to oscillate, capacitor 58 will be charged to a high enough voltage that PWM circuit 200 can function. Capacitor 232 then turns on transistor 231, and a current is supplied through resistor 233 to the base of transistor 224. Transistor 224 remains on and transistor 50 remains off until capacitor 232 is charged through resistor 235. When power is removed from the ballast, the voltage at terminal 206 collapses, and capacitor 232 is discharged through diode 234.

In inverter 100, the collector of a power switching transistor 303 is connected to DC input terminal 101, and the emitter of transistor 303 is connected through resistor 304 to a half-bridge output terminal 321. Diode 301 is connected in an anti-parallel manner across the series combination of transistor 303 and resistor 304. The collector of a second power switching transistor 306 is connected to terminal 321, and the emitter of transistor 306 is coupled through resistor 306 to inverter common terminal 102. Diode 302 is connected in an anti-parallel manner across the series combination of transistor 306 and resistor 307.

When power is first applied to the ballast circuit, the series combination of bulk capacitors 54a and 54b is charged to the peak value of the AC line voltage. This voltage level is supplied across inverter input terminals 101 and 102 until the boost circuit begins operating. Capacitor 313 is charged from terminal 101 through resistors 318a and 318b until the voltage across capacitor 313 is great enough to break over diac 309, which is connected between the base of transistor 306 and the junction of capacitor 313 and resistor 318b. When diac 309 fires, it delivers a pulse of current to the base of transistor 306, which initiates oscillations in inverter 100. Resistors 319a and 319b are connected in series between DC input terminal 101 and half-bridge output terminal 321. This pulls the collector of transistor 306 high when power is first applied to the ballast, which makes it easier to start oscillations in the inverter when diac 309 fires. A diode 314 is connected between the collector of transistor 306 and the junction of capacitor 313 and diac 309. Once oscillations have begun, diode 314 prevents capacitor 313 from charging to a high enough voltage to break over diac 309.

A resistor 312 is connected between the base of transistor 303 and one end of a secondary winding 310b of current transformer 310. The second end of winding 310b is connected to half-bridge output terminal 321. A resistor 311 is connected between the base of transistor 306 and one end of a secondary winding 310c of current transformer 310. The second end of winding 310c is connected to common terminal 102. Transistors 306 and 303 are forced to conduct in an alternating sequence due to the phasing of windings 310b and 310c, which provide positive feedback for the inverter. Capacitor 305 is connected between the base of transistor 303 and terminal 321, and capacitor 308 is connected between the base of transistor 306 and common terminal 102. These capacitors delay the turn-on time of transistors 303 and 306 so as to prevent simultaneous conduction of both transistors.

Primary winding 310a of current transformer 310 is connected between half-bridge output terminal 321 and one end of winding 320a of resonant inductor 320. The other end of winding 320a is connected to inverter output terminal 105. The current flowing in winding 310a is the source of the base drive current supplied by windings 310b and 310c. Transistors 303 and 306 are turned off when the core of transformer 310 saturates. Resonating capacitor 317 is connected between the junction of bulk capacitors 54a and 54b. The terminal of capacitor 317 that is connected to the junction of the two bulk capacitors could be alternatively connected to either the positive terminal of capacitor 54a or the negative terminal of capacitor 54b.

Load 160 is connected between inverter output terminals 104 and 105. Load 160 comprises two U-shaped lamps, 171 and 172, connected in series, and two filament heating components, winding 320d and capacitor 163. U-shaped lamps are bent so that both filaments are on the same side. This makes it possible to use a non-isolated ballast without creating a shock hazard since, when changing a lamp, both ends of the lamp are removed from their respective sockets at the same time.

Inverter output 104 is connected to one end of filament 173 of lamp 171, and inverter output 105 is connected to one end of filament 176 of lamp 172. A capacitor 163 is connected between the ends of filaments 173 and 176 that are not connected to an inverter output terminal. Capacitor 163 serves two functions. Before the lamps are lit, the path between the two filaments of each lamp is essentially an open circuit. Capacitor 163 completes a path between the two inverter output terminals so that oscillations can occur in the inverter. The way the filaments are connected with capacitor 163 forces inverter 100 to cease oscillating if either of the two lamps are removed. The second function of capacitor 163 is that the resonant current flowing through it heats filaments 173 and 176. Filaments 174 and 175 are connected in parallel with each other and with winding 320d on inductor 320. Winding 320d provides heating for filaments 174 and 175.

A clamp circuit is used to limit the starting voltage applied to the lamps. Diodes 315 and 316 are connected in series such that the cathode of diode 316 is connected to DC input terminal 101, and the anode of diode 315 is connected to common terminal 102. The junction of these diodes is connected to one end of a winding 320b on inductor 320. The other end of winding 320b is connected to the junction of inverter output terminal 104 and resonant capacitor 317. When lamps 171 and 172 are connected to an operating ballast but are not yet lit, the inverter output voltage between terminals 104 and 105 will rise until diodes 315 and 316 alternately conduct and limit the output voltage. In a prior-art ballast employing a similar series-resonant inverter, the end of a winding similar to 320b that is connected to terminal 104 is connected instead to the junction of two bulk capacitors. This resulted in large current spikes through the winding and the diodes that could lead to the failure of the ballast. In contrast, the connection specified in the present invention allows diodes 315 and 316 to conduct a smaller current for a longer conduction angle because capacitor 317 has a small enough value (i.e., a high enough impedance) that a significant AC voltage is developed across capacitor 317 whenever either of diodes 315 or 316 is forward biased. This produces lower losses since the heating in a resistance is proportional to the square of the current through it.

Component values for a ballast intended to operate two 31 W U-shaped T8 lamps are as follows:

| | |
|---|---|
| 10 | 277 V, 60 Hz |
| 21 | 30 mH |
| 22 | 1.3 mH |
| 23 | 100 nF |
| 24 | 1.5 nF |
| 40 | 1N4007 x4 |
| 45 | 100 nF |
| 46a | 187 kΩ |
| 46b | 187 kΩ |
| 47 | UF4007 |
| 48 | 8.06 kΩ |
| 49 | 2.4 Ω |
| 50 | IRFB20 |
| 52 | 6 mH |
| 53 | UF4007 |
| 54a | 22 μF |
| 54b | 22 μF |
| 56 | EGP10A |
| 58 | 47 μF |
| 163 | 3.9 nF |
| 220 | 100 Ω |
| 221 | 1 nF |
| 223 | 2N4401 |
| 224 | 2N4401 |
| 225 | 2.2 nF |
| 226 | 1.1 kΩ |
| 227 | 6.8 V, 0.5 W |
| 228 | 100 Ω |
| 229 | 150 Ω |
| 231 | 2N4401 |
| 232 | 22 μF |
| 233 | 91 Ω |
| 234 | 1N4148 |
| 235 | 75 kΩ |
| 236 | 6.8 V, 0.5 W |
| 301 | UF4007 |

| | |
|---|---|
| 302 | UF4007 |
| 303 | MJE18204 |
| 304 | 1.5 Ω |
| 305 | 100 nF |
| 306 | MJE18204 |
| 307 | 1.5 Ω |
| 308 | 100 nF |
| 309 | HT-32 |
| 310a | 162 μH |
| 310b | 90 μH |
| 310c | 90 μH |
| 311 | 18 Ω |
| 312 | 18 Ω |
| 313 | 100 nF |
| 314 | 1N4007 |
| 315 | UF4007 |
| 316 | UF4007 |
| 317 | 8.2 nF |
| 318a | 1.5 MΩ |
| 318b | 1.5 MΩ |
| 319a | 1.5 MΩ |
| 319b | 1.5 MΩ |
| 320a | 14.2 mH |
| 320b | 106 μH |
| 320c | 3.9 μH |
| 320d | 1.0 μH |

FIG. 9 shows a schematic of a alternative embodiment of an electronic ballast according to the present invention suitable for operation from a 120 V AC source. Except for the changes noted below, the structure and function of the EMI filter, PWM, and inverter circuits in FIG. 9 are the same as those shown in FIG. 8. The rectifier and boost circuits, however, are significantly different. The optimum ratio of bulk voltage to load voltage for a series-loaded, series-resonant circuit is about 2:1. The voltage for two 31 W T8 lamps is about 280 V, so a bulk voltage of 570 V is suitable. This voltage is readily achievable with a boost circuit operating from a 277 V AC source, but it is not efficient to boost to such a high voltage from a 120 V AC source.

The ballast shown in FIG. 9 employs a voltage-doubling boost power factor correction circuit in order to achieve a 570 V bulk voltage from a 120 V AC source. A few modifications are required to convert a standard boost circuit into a voltage-doubling boost circuit. Boost inductor 52 is removed from the position shown in the previous figures, and is inserted between AC input terminal 42 of bridge rectifier 40 and output terminal 25 of EMI filter 20. Diode 53 has been renamed diode 53a. A diode 53b is inserted between the negative terminal of capacitor 54b and the junction of negative bridge terminal 44 with resistors 48 and 49. The output voltage of bridge rectifier 40 is chopped due to the switching action of transistor 50. Capacitor 61 is connected between negative bridge terminal 44 and the junction of resistors 46a and 46b to form a low-pass filter for the feedforward signal applied to input 204 of PWM circuit 200. Common terminal 212 of PWM circuit 200 is connected to bridge terminal 44, and is no longer connected to common terminal 102 of inverter 100. Consequently, the end of winding 320c that is connected to terminal 102 in FIG. 8 is instead connected to terminal 107, which is connected to PWM common terminal 212.

The boost circuit operates as the combination of a boost power factor correction circuit and a voltage doubler rectifier. When input terminal 11 is positive with respect to input terminal 12, then the current entering terminal 11 will flow through EMI filter 20, inductor 52, terminals 42 and 43 of bridge rectifier 40, and one of two directions, depending on the state of switch 50. When switch 50 is on, energy is stored in inductor 52 as the current flowing out of terminal 43 flows through switch 50 and back to input terminals 12 through bridge terminals 44 and 41. When switch 50 is off, the energy stored in inductor 52 is transferred to capacitor 54a as the current leaving bridge terminals 43 flows through diode 53a, capacitor 54a, and out through terminal 12 after passing through EMI filter 20.

When input terminal 12 is positive with respect to input terminal 11, then the current entering terminal 12 will flow through EMI filter 20, and one of two directions, depending on the state of switch 50. When switch 50 is on, energy is stored in inductor 52 as the current flowing out of EMI filter terminal 26 flows through bridge terminals 41 and 43, through switch 50, and back to input terminal 11 through bridge terminals 44 and 42, inductor 52 and EMI filter 20. When switch 50 is off, the energy stored in inductor 52 is transferred to capacitor 54b as the current leaving EMI filter terminal 26 flows through diode 53b, capacitor 54b and out through input terminal 11 after passing through bridge terminals 44 and 42, inductor 52, and EMI filter 20.

The maximum voltage across transistor 50 is the peak voltage across one of the bulk capacitors 54a, 54b, or approximately half of the total bulk voltage. This allows transistor 50 to have a lower voltage rating than would be required in a conventional boost circuit. The reduced voltage rating allows transistor 50 to have a low "on" resistance.

Component values for a ballast intended to operated two 31 W U-shaped T8 lamps are as follows:

| | |
|---|---|
| 10 | 120 V, 60 Hz |
| 21 | 30 mH |
| 22 | 1.3 mH |
| 23 | 470 nF |
| 24 | 3.3 nF |
| 40 | 1N4007 x4 |
| 45 | 100 nF |
| 46a | 47 kΩ |
| 46b | 47 kΩ |
| 47 | UF4007 |
| 48 | 5.1 kΩ |
| 49 | 1.5 Ω |
| 50 | IRF730 |
| 52 | 1.2 mH |
| 53 | UF4007 |
| 54a | 33 μF |
| 54b | 33 μF |
| 56 | EGP 10A |
| 58 | 47 μF |
| 163 | 3.9 nF |
| 220 | 100 Ω |
| 221 | 4.7 nF |
| 223 | 2N4401 |
| 224 | 2N4401 |
| 225 | 4.7 nF |
| 226 | 300 Ω |
| 227 | 6.8 V, 0.5 W |
| 228 | 100 Ω |
| 229 | 150 Ω |
| 231 | 2N4401 |
| 232 | 22 μF |
| 233 | 91 Ω |
| 234 | 1N4148 |
| 235 | 75 kΩ |
| 236 | 6.8 V, 0.5 W |
| 301 | UF4007 |
| 302 | UF4007 |
| 303 | MJE18204 |
| 304 | 1.5 Ω |
| 305 | 100 nF |
| 306 | MJE18204 |
| 307 | 1.5 Ω |
| 308 | 100 nF |
| 309 | HT-32 |
| 310a | 162 μH |
| 310b | 90 μH |
| 310c | 90 μH |
| 311 | 18 Ω |

-continued

| 312 | 18 Ω |
| --- | --- |
| 313 | 100 nF |
| 314 | 1N4007 |
| 315 | UF4007 |
| 316 | UF4007 |
| 317 | 8.2 nF |
| 318a | 1.5 MΩ |
| 319a | 1.5 MΩ |
| 319b | 106 μH |
| 320a | 14.2 mH |
| 320b | 106 mH |
| 320b | 106 μH |
| 320c | 3.9 μH |
| 320d | 1.0 μH |

Figure 10:
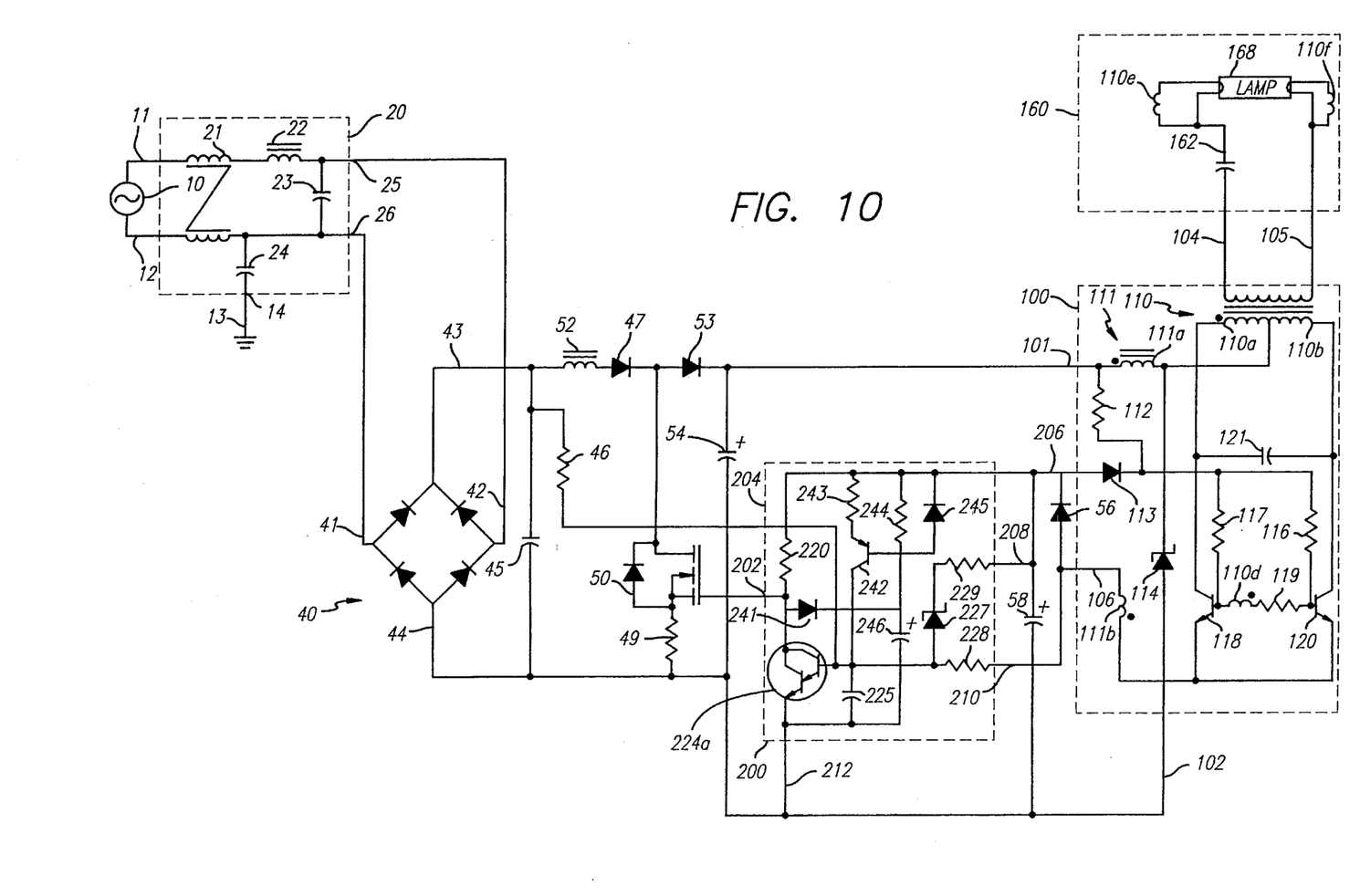
FIG. 10 shows a circuit diagram of a preferred embodiment of an electronic ballast according to the present invention that employs alternative embodiments of the pulse width modulator and boost hold-off circuits.

FIG. 10 shows a circuit diagram of a preferred embodiment of an electronic ballast according to the present invention that employs alternative embodiments of the pulse width modulator and boost hold-off circuits. The FIG. 10 circuit is a one-lamp rapid-start ballast similar to that shown in FIG. 5. In the FIG. 10 embodiment, transistor 224a is a Darlington transistor, instead of the single bipolar transistor 224 shown in FIG. 5. Since Darlington transistors can be controlled with a very small base current, resistors 228 and 229 have much larger values than the corresponding resistors used in the previously described embodiments. Consequently, transistor 223, capacitor 221, and resistors 48 and 228 shown in FIG. 5 and not required in the FIG. 10 circuit. In the FIG. 10 embodiment, resistor 46, by itself, creates the feedforward signal.

In FIGS. 7–9, diode 47 is placed in series with the drain of transistor 50 so as to prevent the drain-to-source and stray capacitor of transistor 50 from resonating with inductor 52 during the dead time interval that is labeled $t_d$ in FIG. 2. In FIG. 10, diode 47 is instead placed in series with inductor 52. This connection is more effective at suppressing the ringing, but it less efficient since diode 47 conducts during interval $t_{on}$ in addition to interval $t_b$.

The circuit of FIG. 10 is a rapid start ballast. Filament heating is provided by windings 110e and 110f on transformer 110 that are connected o the filaments of lamp 168. Pulse width modulator circuit 200 has a boost hold-off circuit that has a faster boost turn-on transition interval than the hold-off circuit shown in FIGS. 8 and 9. The hold-off circuit uses a PNP transistor 242 instead of NPN transistor 231 used in FIGS. 8 and 9.

A resistor 243 is connected between DC input terminal 206 of PWM circuit 200 and the emitter of transistor 242. A resistor 244 and a diode 245 are connected in parallel between the base of transistor 242 and terminals 206, with the anode connected to the base. A capacitor 256 is connected between the base of transistor 242 and common terminal 212. The collector of transistor 242 is connected to the base of transistor 224. The anode of a diode 241 is connected to the collector of transistor 224, and the cathode of the diode is connected to the base of transistor 242.

When power is first applied to the ballast, capacitor 246 will be discharged. After inverter 100 begins to oscillate, capacitor 58 will be charged to a high enough voltage that PWM circuit 200 can function. Capacitor 246 then turns on transistor 242, and a current is supplied to the base of transistor 224 from the collector of transistor 242. This current is limited by resistor 243. Transistor 224 remains on and transistor 50 remains off until capacitor 246 is charged through resistor 244. When transistor 224 turns on, diode 241 conducts, rapidly charging capacitor 246 to a higher voltage. Diode 241 provides positive feedback, which rapidly shuts down the hold-off circuit. When power is removed from the ballast, the voltage at terminal 206 collapses, and capacitor 246 is discharged through diode 245.

Component values for a ballast circuit intended to operate one 32 W T8 lamp are as follows:

| 10 | 120 V, 60 Hz |
| --- | --- |
| 21 | 1.75 mH |
| 22 | 470 μH |
| 23 | 220 nF |
| 24 | 3.3 nF |
| 40 | 1N4007 x4 |
| 45 | 220 nF |
| 46 | 90.9 kΩ |
| 47 | UF4007 |
| 49 | 0.47 Ω |
| 50 | IRF730 |
| 52 | 880 μH |
| 53 | UF4007 |
| 54 | 47 μF |
| 56 | EGP10A |
| 58 | 47 μF |
| 110a | 2.69 mH |
| 110b | 2.69 mH |
| 110c | 6.31 mH |
| 110d | 512 nH |
| 110e | 512 nH |
| 110f | 512 nH |
| 111a | 11.7 mH |
| 111b | 78.3 μH |
| 112 | 330 kΩ |
| 113 | EGP10A |
| 114 | 440 V, 5 W |
| 116 | 1.5 kΩ |
| 117 | 1.5 kΩ |
| 118 | MJE18204 |
| 119 | 1.5 Ω |
| 120 | MJE18204 |
| 121 | 1.5 nF |
| 162 | 3.3 nF |
| 220 | 100 Ω |
| 221 | 4.7 nF |
| 224 | MPSA14 |
| 225 | 4.7 nF |
| 226 | 300 Ω |
| 227 | 9.1 V, 0.5 W |
| 228 | 910 Ω |
| 229 | 220 Ω |
| 241 | EGP10A |
| 242 | 2N3906 |
| 243 | 1.5 kΩ |
| 244 | 68 kΩ |
| 245 | 1N4148 |
| 246 | 10 μF |

There are several useful variations of the circuits that have been presented thus far that are within the scope of the invention. There are many variations of parallel-resonant and series-resonant inverters that produce inductor voltage waveforms similar to those found in the circuits shown in FIGS. 5, 7, 8, and 9. For example, full-bridge inverters could be used instead of half-bridge inverters. The essential characteristic of an inverter circuit to be used in accordance with the present invention is that the circuit have a waveform that can be used to create a reference waveform signal that can be combined with other signals to create a pulse-width modulated signal.

In FIGS. 5, 7, 8, and 9, a boost power converter circuit was utilized to control the input current to the ballast. Buck-boost and flyback power converter circuits operating in discontinuous conduction mode could also be realized using PWM circuits that are similar to the ones shown in FIGS. 5, 7, 8, and 9, except that the feedforward input is not required. The average input current of discontinuous-mode buck-boost and flyback circuits naturally follows the input voltage when the duty cycle is constant over each AC line cycle. Buck-boost and flyback power-factor correction circuits are useful when the bulk voltage must be less than the peak of the AC line voltage. They are also useful when inrush currents at power-up must be low. Flyback circuits are also useful when isolation is required. Boost circuits are shown in FIGS. 5 and 7–9 because they are inherently more efficient than buck-boost and flyback circuits.

While the foregoing description includes detail which will enable those skilled in the art to practice the invention, it should be recognized that the description is illustrative in nature and that many modifications and variations will be apparent to those skilled in the art having the benefit of these teachings. It is accordingly intended that the invention herein be defined solely by the claims appended hereto and that the claims be interpreted as broadly as permitted in light of the prior art.

What is claimed is:

1. A power factor corrected circuit comprising:

rectifier means for rectifying voltage from an AC source;

power converter means actuated by a control pulse signal for converting the rectified voltage into current pulses, the magnitude of the current pulses being dependent upon the duty cycle of the pulse signal;

capacitive bulk energy storage means for storing the output of the power converter means as a bulk DC voltage;

feedback signal means for developing a feedback signal related to the level of the bulk DC voltage;

oscillating inverter means for converting the bulk DC voltage into an AC signal for driving a load at a frequency that is substantially greater than the frequency of the AC source;

means for providing a reference waveform signal that is derived from the oscillations of the inverter;

pulse-width modulation means for providing as an output the control pulse signal, the pulse width modulation means including comparator means for comparing a combination of the reference waveform signal and the feedback signal with a threshold voltage, the pulse width modulation means further including an output terminal that is actuated when the combination of the reference waveform signal and the feedback signal exceeds the threshold voltage, such that a change in the level of the feedback signal causes an adjustment of the duty cycle of the control pulse signal so as to regulate the level of the bulk DC voltage.

2. A circuit according to claim 1, wherein the means for providing the reference waveform signal is inductively coupled to the inverter means.

3. A circuit according to claim 1, further including means for rectifying the reference voltage waveform signal to provide a power supply voltage for the pulse-width modulator means.

4. A circuit according to claim 3, wherein the feedback signal means includes a resistor and a reverse-biased zener diode connected in series between the power supply voltage for the pulse width modulation means and the input terminal of the comparator means.

5. A circuit according to claim 1, wherein the comparator means is a transistor.

6. A circuit according to claim 1, wherein the power converter is a boost converter.

7. A circuit according to claim 6, wherein the level of the rectified voltage from the AC source varies with time, and wherein the circuit further includes:

feedforward signal means for providing a signal proportional to the time-varying level of the rectified voltage form the AC source, the pulse width modulation means further including means for receiving the feedforward signal and combining it with the reference waveform signal and the feedback signal, thereby modulating the duty cycle of the pulse signal output of the pulse width modulation means so as to reduce harmonic currents drawn from the AC source.

8. A method for controlling the power factor of a ballast circuit, comprising the following steps:

(a) rectifying an AC supply voltage;

(b) converting the rectified AC supply voltage to current pulses using a switching power converter that is controlled by a pulse signal of variable duty cycle, the magnitude of the current pulses being dependent upon the duty cycle of the pulse signal;

(c) storing the output energy of the power converter as a bulk DC voltage across a capacitive energy storage means;

(d) converting the bulk DC voltage into an AC signal with an oscillating inverter that drives a load at a frequency substantially greater than the frequency of the AC supply voltage;

(e) deriving a reference waveform signal from the oscillations of the inverter;

(f) deriving a feedback signal that is related to the level of the bulk DC voltage;

(g) creating a composite control signal by combining the reference waveform signal with the feedback signal;

(h) generating the pulse signal used to control the power converter by comparing the composite control signal with a fixed reference voltage.

9. A method according to claim 8, wherein the amplitude of the rectified AC supply voltage varies with time and wherein the power converter is a boost converter, the method further including the following steps:

deriving a feedforward signal that is proportional to the time-varying amplitude of the rectified AC supply voltage;

combining the feedforward signal with the reference waveform signal and the feedback signal to create the composite control signal, so as to modulate the duty cycle of the pulse signal to reduce the harmonic currents drawn from the AC source.

* * * * *